Patented Apr. 14, 1925.

1,533,326

UNITED STATES PATENT OFFICE.

EUGENE A. MARSHALL, OF RICHMOND, AND WILLIAM J. BURKE, OF SAN RAFAEL, CALIFORNIA.

METHOD FOR REMOVING VARNISH AND PAINT.

No Drawing.   Application filed August 15, 1921.   Serial No. 492,469.

*To all whom it may concern:*

Be it known that we, EUGENE A. MARSHALL and WILLIAM J. BURKE, citizens of the United States, residing, respectively, at Richmond, in the county of Contra Costa and State of California, and San Rafael, in the county of Marin and State of California, have invented certain new and useful Improvements in Methods for Removing Varnish and Paint, of which the following is a specification.

The hereinafter described invention comprises a method and compound for the removal of varnish and paint for cleaning coated surfaces to place the same in original condition, that is, the condition prior to that of having paint and varnish applied thereto, the invention being more especially designed for the removal of varnish and paint from automobiles, wood-work and metal generally for the purpose of conditioning the same to receive a fresh coating of paint and varnish; the object of the invention being to quickly, efficiently, and economically clean the surface of materials of paint and varnish and to do so without injury to the material or to the hands of the operator.

We have discovered that if an application of a liquid solution containing a caustic alkaline—such as lye and a moisture retaining and air excluding ingredient, as, for instance, cement preferably Portland cement, lime or other inert ingredient capable of causing adherence in the nature of a film covering for the caustic alkaline be applied to the coating of varnish and paint to be removed and the same permitted to remain as a solvent coating for a predetermined period of time—say from fifteen to thirty minutes dependent on the material to be removed, the caustic alkaline constituent of the solution penetrates and cuts the varnish and paint through to the surface to be cleaned, while the inert ingredient of the liquid retains the moisture of the caustic alkaline and provides, so to speak, an air excluding film therefor. The solution as thus applied and permitted to stand forms a substantial semi-hardened covering for the varnish and paint to which it is applied as a solvent and in such condition may be permitted to stand for a number of days without effecting its solvent and removal properties. In order to remove the paint and varnish from the covered surface, it is only required to wash the solution coated surface with water applied by means of a sponge, when the varnish and paint is cut from the covered surface and the material left standing in its original condition. To prevent a staining of the surface of the material by the solution employed where varnish and paint is to be removed from wood surfaces, we incorporate in the solution a bleaching ingredient, such for instance as borax.

The solvent preparation or body for the removing solution is packaged for the market in a dry condition, the proportion of the ingredients employed being substantially as follows for a hundred pound mixture:—

|   | Pounds. |
|---|---|
| Lye | 10 |
| Portland cement | 80 |
| Borax | 10 |

The lye utilized contains as active ingredients sodium hydroxide, sodium carbonate, and as inert ingredients sodium chloride and sodium sulphate.

The ingredients above specified in substantially the proportions set forth are thoroughly intermixed and packed in one and one-half pound cartons, sealed in any given manner. When required for use the contents of a carton—i. e. one and one-half pounds of the mixture is dissolved in one quart of water—hot water and the solution thus formed applied to the paint or varnish to be removed by means of an ordinary brush. After the solution has set, the same is washed off with hot water preferably applied with a sponge in a manner similar to washing the body of a vehicle and with the removal thereof the cut varnish and paint comes off therewith, leaving the body of the material thoroughly cleaned and in original condition.

Where paint and varnish is to be removed from metallic surface, the borax may be eliminated, in which case the quantity of lye should be increased to twenty pounds, or in other words one part lye to four parts of Portland cement.

By the use of the described invention we are enabled to thoroughly remove the varnish and paint from a metallic body of an automobile in a comparatively short period of time, for the washing off of the cut varnish and paint may take place within less than one hour after solvent solution has been applied thereto, in other words the painted metallic body of an automobile may be thoroughly cleaned of its varnish and paint and be placed in condition for the work of repainting in less than one day.

Having described the invention what is claimed as new and desired to be protected by Letters Patent is:—

The method of removing varnish and paint from surfaces which consists in first forming a hot liquid mixture containing caustic alkaline solution and Portland cement in sufficient volume to provide a relatively thick liquid, applying the mixture while hot to the coated surface to be treated and permitting the same to remain thereon to cool to enable the cement to set and form a thin film coating, and then by the application of hot water removing the thin film coating and softened paint and varnish.

In testimony whereof we have signed our names to this specification.

EUGENE A. MARSHALL.
WILLIAM J. BURKE.